United States Patent [19]
Okita et al.

[11] Patent Number: 5,492,764
[45] Date of Patent: Feb. 20, 1996

[54] MAGNETIC RECORDING MEDIUM HAVING A PROTECTIVE LAYER CONTAINING A TETRAZAINDENE OR THIOURACIL CYCLIC COMPOUND AND A FLUORINE COMPOUND

[75] Inventors: Tsutomu Okita; Toshio Ishida; Masaki Satake; Tadashi Yasunaga; Kazuyuki Usuki, all of Odawara, Japan

[73] Assignee: Fuji Photo Film Co., Ltd., Kanagawa, Japan

[21] Appl. No.: 364,410

[22] Filed: Dec. 23, 1994

Related U.S. Application Data

[63] Continuation of Ser. No. 105,064, Aug. 12, 1993, abandoned.

[30] Foreign Application Priority Data

Aug. 18, 1992 [JP] Japan .................................. 4-219357

[51] Int. Cl.⁶ ....................................................... G11B 5/00
[52] U.S. Cl. ..................................... 428/457; 428/694 TP; 428/694 TF; 428/900
[58] Field of Search ............................ 428/694 TP, 900, 428/457, 694 TF; 544/309

[56] References Cited

U.S. PATENT DOCUMENTS

| | | | |
|---|---|---|---|
| 4,329,239 | 5/1982 | Chou | 252/51.5 A |
| 4,735,848 | 4/1988 | Kondo et al. | 428/219 |
| 4,937,098 | 6/1990 | Nishikawa et al. | 427/132 |

FOREIGN PATENT DOCUMENTS 61-223070  10/1986  Japan .

*Primary Examiner*—Stevan A. Resan
*Attorney, Agent, or Firm*—Sughrue, Mion, Zinn, Macpeak & Seas

[57] ABSTRACT

The magnetic recording medium of the present invention comprises a ferromagnetic metallic thin film formed on a non-magnetic support, whereby a protective layer is formed on the ferromagnetic metallic thin film, said protective layer contains at least one type of thiouracil cyclic compounds having hydrocarbon group and at least one type of fluorine compounds having hydrocarbon group, or at least one type of tetrazaindene cyclic compounds and at least one type of fluorine compounds having hydrocarbon group, and no rusting occurs even when it is repeatedly run.

8 Claims, No Drawings

MAGNETIC RECORDING MEDIUM HAVING A PROTECTIVE LAYER CONTAINING A TETRAZAINDENE OR THIOURACIL CYCLIC COMPOUND AND A FLUORINE COMPOUND

This is a continuation of application Ser. No. 08/105,064, filed on Aug. 12, 1993, now abandoned.

BACKGROUND OF THE INVENTION

The present invention relates to a magnetic recording medium having a ferromagnetic metallic thin film formed on a non-magnetic support, and in particular to a magnetic recording medium with a protecting layer containing a rust preventive and a lubricant on a ferromagnetic thin film, and also to a magnetic recording medium having a lubricating layer containing an organic fluorine compound on a magnetic layer.

The magnetic recording medium such as magnetic tape, floppy disk, etc., is divided to coating type magnetic recording medium, in which a coating solution containing ferromagnetic powder dispersed in a composition consisting of dispersing agent, bonding agent, etc. is coated on a non-magnetic support, and also to metallic thin film type magnetic recording medium, which comprises a ferromagnetic metallic thin film formed on a non-magnetic support by film forming method such as vacuum deposition, sputtering, ion plating, etc.

With the advent of high definition television system and technical progress such as digitization of recording system, there are now strong demands on magnetic recording medium suitable for high density recording.

The metal thin film type magnetic recording medium, which has a ferromagnetic thin film, made of ferromagnetic metal such as cobalt, nickel, etc. or alloy of these metals, as magnetic layer, is very suitable as the magnetic recording medium for high density recording because, unlike the coating type magnetic recording medium, it contains no material other than magnetic materials, such as bonding agent, in the magnetic layer.

However, in the metal thin film type magnetic recording medium, the surface of the metal thin film is susceptible to corrosion and such corrosion adversely affects electromagnetic transducing characteristics and has problems in preservation property and stability. Because the metal thin film is very thin and the surface is extremely smooth, it has serious disadvantage such as poor running property and low durability in practical application.

In particular, the magnetic recording medium is now used under a wide variety of environmental conditions, and there is imminent need to prevent corrosion of metal thin film under high temperature and high humidity conditions and to maintain preservation property under serious environmental conditions.

On the other hand, to maintain good running property and high durability, it is effective to form a lubricating layer containing fluorine compound on the surface of metal thin film. Above all, the compound having polar group is effective to provide stable lubricating protective layer because it firmly attaches on the surface of the magnetic layer. It is widely known that the organic fluorine compound containing perfluoroalkyl group is both hydrophobic and lipophobic and exhibits the property as surface active agent in water and oil. Also, it has property to reduce surface energy, and sliding property and lubricating property of materials can be improved by coating organic fluorine compound.

For example, Japanese Patent Publication Laid-Open 3-102614 describes a lubricant, which possesses —COCO— and —SS— at the center of perfluoro-polyether chain, while this causes corrosion problem on magnetic recording medium and thin film head because of —COCO— and —SS—.

Japanese Patent Laid-Open Publication 64-72313 describes the formation of a monomolecular layer of perfluoroalkyl group - alkyl group - polar group on ferromagnetic metallic thin film. However, the formation of monomolecular film by Langmuir-Blodgett's (LB) film is poor in productivity and is not very practical. Further, it is inferior in kinetic friction coefficient, μ value, still mode durability and preservation property.

In Japanese Patent Publication 3-19602 and Japanese Patent Laid-Open Publication 54-79366, a lubricant is disclosed, which contains fluorine type hydrocarbon compound having —$SO_3Na$, —$SO_3K$, —$SO_3H$, —COOH, etc., but this is also inferior in μ value, still durability, and preservation property.

Japanese Patent Laid-Open Publications 3-241524 and 62-92227 describe the coating of a compound having fluoroalkyl group and aliphatic alkyl group on ferromagnetic metallic thin film. Although this compound can be coated by isopropanol through the introduction of alkyl group, it is inferior in μ value, still durability and preservation property.

In addition to the coating of the above lubricant on magnetic recording layer, the use of perfluoroalkyl polyether and its derivatives is described (Japanese Patent Laid-Open Publications 60-61918, 61-107528, U.S. Pat. No. 3,778,308, Japanese Patent Publication 60-10368, U.S. Pat. No. 4,897, 211, etc.). However, the lubricants containing fluorine type organic compound has high friction coefficient at low speed with the partner material when tape is sliding. The lubricants have also problems with preservation property because magnetic layer is detached due to corrosion by acidic gas such as sulfur dioxide and are not suitable as magnetic recording medium used in practical application.

Most of the above lubricants are not soluble in organic solvents of normal hydrocarbon type, such as acetone, methylethylketone, ethyl acetate, alcohols, toluene, etc., and it is necessary to use fluorine type organic solvents when coating. However, fluorine type organic solvents are expensive and also cause the problem of the destruction of ozone layer or aggravate the working environment and are not suitable for practical application.

Further, the problem of corrosion cannot be solved completely in case of fluorine compound, and it is not especially desirable to use the compound with polar group. The stronger the polarity is as in sulfonic group, the more it is not preferable to solve the corrosion problem.

As an approach to prevent rusting on ferromagnetic metallic thin film, there is a method to form oxide thin film on the ferromagnetic metallic thin film, while this reduces magnetic property of the film and also increases the distance between the head and the magnetic layer, thereby reducing electromagnetic transducing characteristics.

In this respect, various methods have been proposed to simultaneously use lubricant and rust preventive. For example, Japanese Patent Publication Laid-Open 61-82324 discloses a ferromagnetic metallic thin film type magnetic recording medium containing a compound having mercapto group as rust preventive, and compounds such as thiophenol, thiouracil, etc. are cited. It is also described to simultaneously use a fluorine type surface active agent as lubricant together with rust preventive. However, such rust preventive layers do not necessarily provide sufficient anti-rusting effect.

Japanese Patent Publication Laid-Open 64-82324 discloses formation of rust preventive layer of nitrogen-containing heterocyclic compound such as benzotriazole on the surface of a ferromagnetic metallic thin film, which contains cobalt as principal component. But, the rust preventive is not enough, and there is no description on synergetic effect with lubricant.

Japanese Patent Publication Laid-Open 58-194133 describes a magnetic recording medium, in which a rust preventive layer, containing a compound having a heterocycle with one or more nitrogen atoms and a phenolic hydroxide group, is formed on a ferromagnetic metallic thin film containing oxygen. As the rust preventives, pyridylazoresorcin, pyridyl-azonaphthol, quinolinol, quinolinediol, and kynurenic acid are disclosed, while these compounds are not enough to provide sufficient rust preventive effect and to ensure good running property and high durability.

Japanese Patent Publication Laid-Open 58-194135 discloses a rust preventive layer having a heterocycle with one or more nitrogen atoms to be attached on a ferromagnetic metallic thin film containing oxygen, but there is no description on simultaneous use with a compound having phenolic OH group or fluorine type lubricant.

Japanese Patent Publication Laid-Open 61-284822 describes a magnetic recording medium, in which an oxide film is formed on the surface of a ferromagnetic metallic thin film and a protective layer containing triazinedithiol is provided on it, but there is no description on rust preventive effect or simultaneous use with fluorine type lubricant.

Also, Japanese Patent Publication Laid-Open 58-189835 describes an adsorption layer of rust preventive agent formed on a ferromagnetic metallic thin film and a lubricant layer formed on the adsorption layer, and rust preventive such as alkylamine, alkyl phosphate, divalent phenol, diarylketone, alkylphenol, naphthol, quinone, nitroso compound, etc. are disclosed, while these rust preventives cannot provide satisfactory rust preventive effect. As the lubricant, fatty acid, fatty acid ester, fatty acid amide, perfluoroalkyl carboxylic acid and sulfonic acid, or fluorine type surface active agent such as perfluoroalkyl fatty acid ester, etc. are disclosed, but sufficient anti-friction effect cannot be obtained.

In case rust preventive and fluorine type lubricant are simultaneously used, the functions of each compound cannot be perfectly fulfilled probably because these compounds inhibit adsorption on metal thin film against each other.

As described above, no effective means has been proposed, which can solve the problems of metal thin film type magnetic recording medium for high density recording, i.e. the problems to improve or increase running property and durability and to improve preservation property and stability.

To solve the above problems, it is an object of the present invention to provide a magnetic recording medium with high density recording, which can provide higher running property, durability and attain high density magnetic recording characteristics and compact design of the metal thin film type medium.

SUMMARY OF THE INVENTION

To attain the above object, the magnetic recording medium according to the present invention comprises a ferromagnetic metallic thin film on a non-magnetic support, whereby a protective layer containing at least one type of thiouracil cyclic compounds having hydrocarbon group and at least one type of fluorine type compounds having hydrocarbon group is formed on said ferromagnetic metallic thin film. The invention also provides a magnetic recording medium comprising a ferromagnetic metallic thin film on a nonmagnetic support, whereby a protective layer containing at least one type of tetrazaindene cyclic compounds and at least one type of fluorine type compounds having hydrocarbon group is formed on said ferromagnetic metallic thin film, The thiouracil cyclic compound having hydrocarbon group of the protective layer described above is given by the following general formula (1):

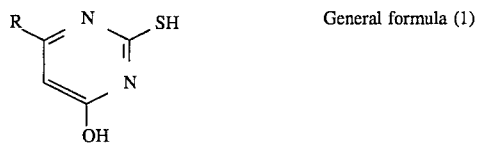

General formula (1)

where R represents a hydrocarbon group, or preferably, a hydrocarbon group having 3 or more carbon atoms, and the hydrocarbon group may contain a substitution group such as alkyl group, alcoxyl group, alkylamide group, etc.

If the number of carbon atoms of the hydrocarbon group connected to thiouracil cycle is less than 3, solubility in solvents is low. Further, barrier property to prevent contact with atmospheric air is low, and rust preventive effect is also low. It is preferable to use alkyl group having 5 to 20 carbon atoms.

In case tetrazaindene cyclic compound is used in the protective layer, it is preferable to use a compound given by the following general formula (2):

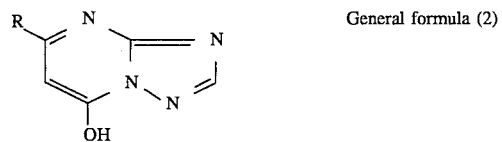

General formula (2)

where R represents a hydrocarbon group, which may be substituted, and it is preferable that the number of carbon atoms is 3 to 26 inclusive, or more preferably, 5 to 20 inclusive. More concretely, it is preferably an alkyl group such as $C_6H_{13}$—, $C_9H_{19}$—, $C_{17}H_{35}$—, etc. or alkoxy group given by $ROCOCH_2$—, where R represents $C_3H_7$—, $C_6H_{13}$— or phenyl. In case of alkylamide given by RNHCO, it is preferably an alkylamide group, in which R represents phenyl or $C_3H_7$—.

The present invention also provides a magnetic recording medium, in which fluorine type compound is one type or more of compounds selected from the following general formulae (3) and (4):

General formula (3)

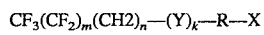

$CF_3(CF_2)_m(CH2)_n$—$(Y)_k$—R—X

General formula (4)

$(CF_3)_2CF(CF_2)_m(CH_2)_n$—$(Y)_k$—R—X where m is an integer of 2 to 12, n is an integer of 0 to 12, k is a number of 0 or 1, R represents a saturated or unsaturated alkylene group having 0 to 12 carbon atoms, and sum of n and the number of carbon atoms in R is 2 or more.

Y is selected from —OCO—, —COO—, —CONH—, or —O—, and X is selected from —OH, —COOH, —SO$_3$M, —$OSO_3M$, —$OPO_3M_2$ or —$PO_3M_2$. Also, M is selected from hydrogen atom, alkali metal or ammonium.

The present invention also provides a magnetic recording medium, in which fluorine type compound is one type or more of compounds selected from the following general formula (5):

General formula (5)

where $R_1$ represents F or $CF_3$, and n is an integer of 10 to 100.

X is a monovalent group selected from —$C_2F_5$, —OH, —COOH, —$SO_3M$, —$OPO_3M_2$ or —$PO_3M_2$, and M is selected from hydrogen atom, alkali metal or ammonium.

DESCRIPTION OF THE PREFERRED EMBODIMENT

The present invention provides a magnetic recording medium, comprising a ferromagnetic metallic thin film on a non-magnetic support, whereby a protective layer containing at least one type of thiouracil cyclic compounds having hydrocarbon group and also at least one type of fluorine compounds having hydrocarbon group is formed on said ferromagnetic metallic thin film. The invention also provides a magnetic recording medium, comprising a ferromagnetic metallic thin film on a non-magnetic support, whereby a protective layer containing at least one type of tetrazaindene cyclic compounds and at least one type of fluorine compounds having hydrocarbon group is formed on said ferromagnetic metallic thin film. The thiouracil cyclic compound having hydrocarbon group and used in the protective layer is given by the following general formula (1):

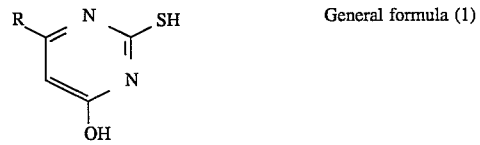

General formula (1)

where R represents a hydrocarbon group, or preferably, a hydrocarbon group having 3 or more carbon atoms, and the hydrocarbon group may contain a substitution group such as alkyl group, alcoxyl group, alkylamide group, etc.

If the number of carbon atoms of the hydrocarbon group connected to thiouracil cycle is less than 3, solubility in solvents is low. Further, barrier property to prevent contact with atmospheric air is low, and rust preventive effect is also low. It is preferable to use alkyl group having 5 to 20 carbon atoms.

In case tetrazaindene cyclic compound is used in the protective layer, it is preferable to use a compound given by the following general formula (2):

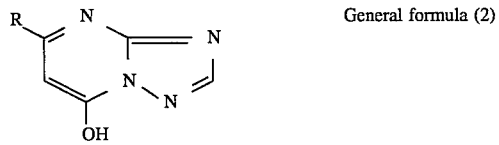

General formula (2)

where R represents a hydrocarbon group, which may be substituted, and it is preferable that the number of carbon atoms is 3 to 26 inclusive, or more preferably, 5 to 20 inclusive. More concretely, it is preferably an alkyl group such as $C_6H_{13}$—, $C_9H_{19}$—, $C_{17}H_{35}$—, etc. or alcoxyl group given by $ROCOCH_2$—, where R represents $C_3H_7$—, $C_6H_{13}$— or phenyl. In case of alkylamide given by RNHCO, it is preferably an alkylamide group, in which R represents phenyl or $C_3H_7$—.

If the number of carbon atoms in R is less than 3, solubility decreases and this is not suitable for magnetic recording medium, and rust preventive effect is also low, and this is not desirable.

Compared with rust preventive agents already known, n electron of nitrogen atom and π electron of heterocycle in tetrazaindene have high electron density, and this increases adsorption potency on the surface of the magnetic layer. Thus, it is adsorbed on active points on the surface of the magnetic layer, which causes rusting. It is estimated that, when adsorbed, heterocycles run in parallel on the surface of the magnetic layer and these heterocycles cover the surface of the magnetic layer. On the other hand, hydrocarbon substitution group increases barrier property and prevents contact between the ferromagnetic metallic thin film of the magnetic layer and atmospheric air, and this seems to increase rust preventive effect.

Further, in the magnetic recording medium of the present invention, when the rust preventive such as thiouracil cyclic compound or tetrazaindene connected with hydrocarbon group and a fluorine compound serving as lubricant are simultaneously used, it is possible to increase running property, durability and preservation property.

As the fluorine compound to be used in the present invention, it is preferable to use carboxylic acid having perfluoroalkyl group, carboxylic acid having alcohol and ammonium salt and perfluoroalkylene group, perfluoropolyether having alcohol and ammonium salt and given by the formula: $CF_3$—$(CHR_fCF_2$—$O)_n$—$CF_2CF_3$, in particular, the compound with its terminals denatured with carboxyl group, hydroxyl group, etc. Here, $R_f$ represents $CF_3$ or F, and molecular weight is 1000 to 20000, or more preferably, 2500 to 10000. As such compounds, there are KRYTOX K143AZ, KRYTOX K157FSL (manufactured by DuPont), FOMBLIN AM2001 (manufactured by Montefluos), DEMNUM BY (manufactured by Daikin Industry).

Further, the following compounds may be used: carboxylic acid perfluoroalkylester disclosed in Japanese Patent Publication Laid-Open 62-236119, fluorine compound with predetermined length ratio of length of lipophilic component and hydrophilic component disclosed in Japanese Patent Publication Laid-Open 53-57004, cationic and ampholytic surface active agent disclosed in Japanese Patent Publication Laid-Open 55-144079, fluorine type hydrocarbon containing polar group disclosed in Japanese Patent Publication Laid-Open 58-29147, perfluoro compound connected with hydrophilic group disclosed in Japanese Patent Publication Laid-Open 61-253634, fluorine compound consisting of semi-fluoro compound and perfluoro-polyether disclosed in Japanese Patent Publication Laid-Open 63-281218, fluorine compound consisting of monomolecular layer of perfluoroalkyl group containing polar group disclosed in Japanese Patent Publication Laid-Open 64-71313, perfluoroalkyl carboxylic acid disclosed in Japanese Patent Publication Laid-Open 2-199621.

It is preferable that fluorine compound is one type or more of compounds selected from the following general formulae (3), (4) and (5):

General formula (3)

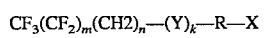

General formula (4)

$$(CF_3)_2CF(CF_2)_m(CH_2)_n-(Y)_k-R-X$$

where m is an integer of 2 to 12, n is an integer of 0 to 12, k is a number of 0 or 1, R represents saturated or unsaturated alkylene group having 0 to 12 carbon atoms, and the sum of n and the number of carbon atoms in R is 2 or more;

Y is selected from —OCO—, —COO—, —CONH—, or —O— and X is selected from —OH, —COOH, —SO$_3$M, —OSO$_3$M, —OPO$_3$M$_2$, or PO$_3$M$_2$. M is selected from hydrogen atom, alkali metal or ammonium.

$$F+CFCF_2O\!\!\overline{\,}_n X \quad\text{or} \qquad\qquad\text{General formula (5)}$$
$$\quad\quad |$$
$$\quad\quad R_1$$

$$F+CF_2CF_2CF_2O\!\!\overline{\,}_n X$$

where $R_1$ represents F or CF$_3$, and n is an integer of 10 to 100.

X is a monovalent group selected from —C$_2$F$_5$, —OH, —COOH, —SO$_3$M, —OPO$_3$M$_2$, —PO$_3$M$_2$, and M is selected from hydrogen atom, alkali metal and ammonium.

More preferably, in general formulae (3) and (4), m is an integer of 4 to 10, n is an integer of 2 to 8, R represents saturated or unsaturated alkylene group having 1 to 6 carbon atoms, Y represents —OCO—, —COO—, or —O—, and X represents —OH, —COOH, or —SO$_3$M. M is hydrogen atom or alkali metal.

In case the compound given in the general formulae (3) and (4) is used, hydrocarbon group in the rust preventive has higher barrier property and has effect to prevent contact with atmospheric air. Because it has interaction with hydrocarbon chain of fluorine compound to be used, a uniform protective layer is formed on the surface of the ferromagnetic metallic thin film together with fluorine compound, and magnetic layer is protected from substances, which cause rusting. In particular, when it is used simultaneously with said fluorine compound, higher protective effect from contaminants can be provided by water-repellent and oil-repellent properties of the fluorine compound. Further, because tetrazaindene cyclic compound is firmly adsorbed on the magnetic layer, detachment of the fluorine compound is also prevented, and running durability can be maintained even when the magnetic recording medium is repeatedly used.

The magnetic layer may be a parallel type dual-layer with columnar crystals tilted in the same direction or may be a cross-type dual-layer with the crystals tilted in opposite directions, or it may be multi-layer having 3 layers or more.

In case the compound given by the general formula (5) is used, it has interaction with aromatic cycle of polyether bonding, and interaction with the rust preventive increases as in the case where the compound given by the general formulae (3) or (4) is used, and it appears that water-repellent and oil-repellent properties of perfluoropolyether can be effectively utilized. In the compound given by the general formula (5), if X at the terminal of molecular chain is polar group such as —OH or —COOH, adsorption potency to ferromagnetic metallic thin film increases, and it is not easily detached from the surface of the magnetic layer even after it has been repeatedly used. Thus, a magnetic recording medium with excellent running durability can be obtained.

As the material of the ferromagnetic metallic thin film in the present invention, it is preferable to use ferromagnetic metal such as cobalt, nickel etc. or ferromagnetic alloy such as Fe-Co, Fe-Ni, etc. formed by deposition. The thickness is preferably within the range of 0.02 to 2 μm, or more preferably, 0.05 to 1.0 μm.

As the non-magnetic support to be used in the present invention, polyethylene terephthalate, polyimide, polyamide, polyethylene naphthalate, etc. may be used.

To increase running durability, it is effective to provide fine projections on the surface of non-magnetic support before the ferromagnetic metallic thin film is formed because adequate irregularities are furnished on the surface of the magnetic layer. The density of the fine projections on the surface of the non-magnetic support is preferably $2\times10^6$ to $2\times10^8$, and the height of projection is preferably 1 to 50 nm. The thickness of the non-magnetic support differs according to the intended purpose, while it is generally 3 to 50 μm.

To increase adhesion of the ferromagnetic metallic thin film, an intermediate layer may be provided between the non-magnetic member and the ferromagnetic metallic thin film.

Further, to increase running property of the magnetic recording medium of the present invention, a back-coat layer of coating film primarily consisting of fine powder such as carbon black and bonding agent resin may be provided on a surface opposite to the surface with the magnetic recording layer of the non-magnetic support.

The rust preventive and the fluorine compound may be coated simultaneously on the ferromagnetic metallic thin film, while it is more effective to coat the rust preventive first, and to coat the fluorine compound thereafter. To coat these substances, these are dissolved in organic solvents and can be coated by coil bar. Because these compounds are dissolved in normal organic solvents such as acetone, alcohol, tetrahydrofurane, etc., there is no possibility to cause environmental problems by the use of fluorine type solvents.

Above all, it is preferable to use organic solvents such as acetone, methylethylketone, methylisobutylketone, cyclohexanone, methanol, ethanol, tetrahydrofurane, etc. It is preferable to coat the rust preventive by 0.1 to 5.0 mg/m$^2$ and the lubricant consisting of fluorine compound by 1.0 to 50 mg/m$^2$. More preferably, the rust preventive is coated by 0.3 to 3 mg/m$^2$, and the lubricant consisting of fluorine compound by 3 to 30 mg/m$^2$.

In the magnetic recording medium of the present invention, rust preventive and fluorine compound with specific structures are used, and this increases the effects, which are obtained when these are used alone, and adsorption potency of the rust preventive to the surface of the magnetic layer is increased. This seems to contribute to higher adsorption of the fluorine compound to the surface of the magnetic layer and the water-repellent property of the fluorine compound contributes to the increases of the effect of the rust preventive.

Particularly, thiouracil cyclic compound or tetrazaindene cyclic compound to be used as the rust preventive has two or four nitrogen atoms in heterocycle respectively. Thus, electron density of n electron of nitrogen atom and π electron in heterocycle is high. This increases adsorption potency to the magnetic layer and it is selectively adsorbed on active points, which cause rusting of metal thin film. Further, it is estimated that heterocycles cover the metal thin film, and substitution groups consisting of hydrocarbon groups also increase barrier property.

In case fluorine compound having hydrocarbon group is used, hydrocarbon group component of the fluorine compound and hydrocarbon group component of the rust preventive exhibit affinity to each other, and this prevents detachment of the fluorine compound having excellent lubricating property. Even when repeatedly used, running property and durability do not change for long time. Because of surface tension of the fluorine compound, attachment of contaminants with rusting property to the magnetic layer can be prevented, and this increases anti-rusting effect of the rust preventive.

In the following, the features of the present invention will be described in detail, referring to the embodiment.

EXAMPLES AND COMPARATIVE EXAMPLES

On polyethylene terephthalate of 10 μm thick, cobalt-nickel magnetic film (thickness: 150 nm) was formed by diagonal deposition, and ferromagnetic metallic thin film layer was prepared. Electron beam evaporating source was used as an evaporating source, and cobalt-nickel alloy (Co: 80 weight %; Ni: 20 weight %) was charged. While introducing oxygen gas under vacuum degree of $6.7 \times 10^{-3}$ N/m$^2$, diagonal deposition was performed at an incident angle of 50 degrees. On the ferromagnetic metallic thin film thus prepared, methylethylketone solutions of thiouracil cyclic compound or tetrazaindene cyclic compound given in Tables 1 and 2 were coated by coil bar and dried. Then, lubricant solution containing fluorine compound was coated by coil bar.

As solvent for the fluorine compound, furon 113 solution was used for perfluoro-polyether, and ethanol solution was used for the others. A back layer was provided on the non-magnetic support, and magnetic tape was prepared by slitting to 8 mm width.

The magnetic tape thus prepared was evaluated by the following method. The results are summarized in Tables 1 and 2.

Method of evaluation (1) Measurement of Friction Coefficient

The magnetic tape prepared above and a stainless ball were brought into contact by tensile force ($T_1$) of 30 g at a contact angle of 180°. The tensile force ($T_2$) required to run the magnetic tape at 3.3 cm/sec was measured.

Friction coefficient μ of the magnetic tape was obtained by the following equation:

$$\mu = 1/\pi \cdot \ln(T_2/T_1)$$

Friction coefficient was determined on the magnetic tape at 23° C. and 70% relative humidity under the following conditions: (A) with the conditions unchanged (before storage); and (B) after stored for 7 days under the condition of 60° C. and 90% relative humidity.

(2) Measurement of Still Durability

Using 8 mm VTR (Fuji Photo Film Co., LTD.; FUJIX-8M6), image was reproduced under still condition without operating still limiting mechanism, and the time until no image appeared any more was measured and evaluated. Still durability was determined at 5° C. and 10% relative humidity on the magnetic tape under the following two conditions: (A) with the conditions unchanged (before storage); and (B) after stored for 7 days under the condition of 60° C. and 90% relative humidity.

(3) Evaluation of Weatherproof Property

The magnetic tape was stored under the following conditions and the surface of the magnetic layer after storage was examined by visual inspection and under light microscope:

Cl$_2$: 10 ppb

NO$_2$: 200 ppb

H$_2$S: 10 ppb

Flow rate of mixture containing the above three gases: 1000 liters/hr.

Temperature and humidity: 600° C.; 90% RH

Days of storage: 10 days

Evaluation criteria

○ . . . When the surface of magnetic layer was examined under light microscope (×200), no sign of corrosion is found.

Δ . . . When examined as above, corrosion is found, but metallic luster is seen on the surface of magnetic layer by visual inspection.

X . . . When examined by visual inspection, no metallic luster is seen on the surface of magnetic layer.

As shown in Tables 1 and 2, the magnetic recording medium of the present invention, which comprises a rust preventive containing of thiouracil compound or tetrazaindene compound having hydrocarbon group and a lubricant containing of fluorine compound having hydrocarbon group, and it exhibits low friction coefficient and high still durability before after storage. In contrast, thiouracil compound without hydrocarbon group, or thiouracil compound having hydrocarbon group containing fewer carbon atoms, or tetrazaindene compound without hydrocarbon group were inferior in friction coefficient, still durability and rusting property after storage.

In case perfluoro-polyether having no hydrocarbon group is used as fluorine compound, satisfactory effects are obtained in still durability and rusting, while it is inferior in friction coefficient compared with the case where fluorine compound having hydrocarbon is used.

TABLE 1

| Specimen No. | Rust preventive and fluorine compound | Coating q'ty (mg/m$^2$) | μ value | Still (min.) | Corrosion |
|---|---|---|---|---|---|
| | | | Above: before storage | | |
| | | | Below: after storage | | |
| 1 | 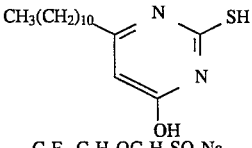 | 10 | 0.20 | 30 or more | — |
| | C$_8$F$_{17}$C$_2$H$_4$OC$_4$H$_8$SO$_3$Na | 10 | 0.21 | 30 or more | ○ |

TABLE 1-continued

| Specimen No. | Rust preventive and fluorine compound | Coating q'ty (mg/m²) | μ value | Still (min.) | Corrosion |
|---|---|---|---|---|---|
| | | | Above: before storage | | |
| | | | Below: after storage | | |
| 2 | CH₃(CH₂)₁₆-pyrimidine-SH (with OH) | 0.5 | 0.22 | 30 or more | — |
| | Perfluoro-polyether Krytox 157FSL (DuPont) | 10 | 0.23 | 30 or more | ○ |
| 3 | C₃H₇-pyrimidine-SH (with OH) | 3.0 | 0.22 | 30 or more | — |
| | (CF₃)₂CF(CF₂)₆C₂H₄OCOC₃H₆CO₂H | 30 | 0.22 | 30 or more | ○ |
| 4 | CH₃-pyrimidine-SH (with OH) | 1.0 | 0.23 | 30 or more | — |
| | C₁₀F₂₁C₆H₁₂OH | 10 | 0.27 | 20 | Δ |
| 5 | benzotriazole (NH) | 1.0 | 0.23 | 30 or more | — |
| | C₈F₁₇C₂H₄OC₄H₈SO₃Na | 10 | 0.50 | 5 | x |
| 6 | pyrimidine-SH (with OH) | 1.0 | 0.25 | 30 or more | — |
| | C₈F₁₇C₂H₄OC₄H₈SO₃Na | 10 | 0.52 | 18 | x |
| 7 | No rust preventive | 0 | 0.22 | 30 or more | — |
| | C₈F₁₇C₁₀H₂₀COOH | 10 | 0.48 | 15 | x |
| 8 | CH₃(CH₂)₁₀-pyrimidine-SH (with OH) | 1.0 | 0.55 | 1 | — |
| | No fluorine compound | 0 | 0.60 | 1 or less | Δ |
| 9 | No rust preventive | 0 | 0.33 | 30 or more | — |
| | F(CFCF₂O)ₙCF₂CF₃ (with CF₃) | 10 | 0.62 | 3 | x |

TABLE 2

| Specimen No. | Rust preventive and fluorine compound | Coating q'ty (mg/m²) | μ value | Still (min.) | Corrosion |
|---|---|---|---|---|---|
| 10 | $C_3H_7OCCH_2$-[triazolopyrimidine-OH] | 10 | 0.20 | 30 or more | — |
|  | $C_{10}F_{21}C_2H_4OC_4H_8SO_3Na$ | 10 | 0.21 | 30 or more | ○ |
| 11 | $C_6H_{13}OCCH_2$-[triazolopyrimidine-OH] | 0.5 | 0.21 | 30 or more | — |
|  | $C_8F_{17}C_{10}H_{20}COOH$ | 10 | 0.21 | 30 or more | ○ |
| 12 | $C_9H_{19}$-[triazolopyrimidine-OH] | 3.0 | 0.21 | 30 or more | — |
|  | $C_4F_9C_{10}H_{20}OH$ | 30 | 0.21 | 30 or more | ○ |
| 13 | $C_9H_{19}CONH$-[triazolopyrimidine-OH] | 1.0 | 0.20 | 30 or more | — |
|  | $(CF_3)_2CFCF(CF_2)_6C_2H_4OCOC_3H_6CO_2H$ | 10 | 0.20 | 30 or more | ○ |
| 14 | $C_3H_7OCCH_2$-[triazolopyrimidine-OH] | 1.0 | 0.50 | 1 | — |
|  | No fluorine compound | 0 | 0.60 | 1 or less | Δ |
| 15 | $CH_3CH_2$-[triazolopyrimidine-OH] | 1.0 | 0.22 | 30 or more | — |
|  | $C_{10}F_{21}C_2H_4OC_4H_8SO_3Na$ | 10 | 0.35 | 30 or more | ○ |
| 16 | [triazolopyrimidine-OH] | 1.0 | 0.23 | 30 or more | — |
|  | $C_{10}F_{21}C_2H_4OC_4H_8SO_3Na$ | 10 | 0.54 | 3 | x |
| 18 | $C_3H_7OCCH_2$-[triazolopyrimidine-OH] | 1.0 | 0.25 | 30 or more | — |
|  | Perfluoro-polyether Krytox 157FSL (DuPont) | 10 | 0.26 | 30 or more | ○ |

By the magnetic recording medium of the present invention, it is possible to provide a high density magnetic recording medium, which comprises a protective layer with high preservation property, running property and durability, which could not be attained by the combination of rust preventive and lubricant known in the past.

This is because the rust preventive and the lubricant with specific structure disclosed in the present invention compensate and increase the effects, which are provided by each of these compounds when used alone. This contributes to the increase of adsorption potency of the rust preventive to the surface of the magnetic layer and the adsorption of the lubricant containing fluorine compound on the surface of the magnetic layer. Also, water-repellent property of fluorine type lubricant of the present invention increases the effect of the rust preventive.

In particular, because thiouracil ring has two hydrogen atoms in OH group and SH group, and two nitrogen atoms in heterocycle, adsorption potency on the surface of the magnetic layer is extremely high, while solubility in solvents is not high and it is not dissolved in normal solvents. Thus, it cannot be coated on the surface of the magnetic layer. However, by substituting with hydrocarbon group having 3 or more carbon atoms in the heterocycle, the solubility in solvents can be improved, and it is possible to provide a protective layer by coating it.

In tetrazaindene cyclic compound, electron density of n electron of nitrogen atom and π electron of heterocycle is high, and this results in high adsorption potency on the surface of the magnetic layer. Thus, it is selectively adsorbed on active points on the surface of the magnetic layer, which cause corrosion. When adsorbed, heterocycles run in parallel on the surface of the magnetic layer and these heterocycles cover the surface of the magnetic layer.

The hydrocarbon substitution group connected to the rust preventive increases solubility to organic solvents and also raises barrier property, and prevents contact of the ferromagnetic metallic thin film with atmospheric air. Also, hydrocarbon group component of the fluorine compound and hydrocarbon group component of the rust preventive have affinity to each other. This prevents detachment of the fluorine compound having excellent lubricating property. Even when repeatedly used, stable running property and durability are exhibited. Low surface tension of the fluorine compound prevents attachment of contaminants with rusting property to the magnetic layer, and this contributes to the increases of anti-rusting property of the rust preventive.

What we claim is:

1. A magnetic recording medium, comprising a ferromagnetic metallic thin film on a non-magnetic support, whereby a protective layer is formed on said ferromagnetic metallic thin film, said protective layer containing (i) at least one thiouracil cyclic compound represented by the following general formula (1):

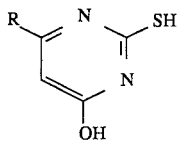 General formula (1)

wherein R represents a hydrocarbon group having 3 to 20 carbon atoms;

or at least one tetrazaindene compound represented by the following general formula (2):

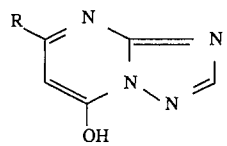 General formula (2)

wherein R represents a hydrocarbon group having 3 to 26 carbon atoms; and (ii) at least one fluorine compound having a hydrocarbon group.

2. A magnetic recording medium according to claim 1, wherein the protective layer contains a thiouracil cyclic compound represented by general formula (1).

3. A magnetic recording medium according to claim 1, wherein the protective layer contains a tetrazaindene cyclic compound represented by general formula (2).

4. A magnetic recording medium according to claims 1 or 3, wherein the hydrocarbon group R of the tetrazaindene cyclic compound is an alkyl group, an alkoxyl group or an alkylamide group having 3 to 26 carbon atoms.

5. A magnetic recording medium according to one of claims 1 to 3, wherein the fluorine compound is one type or more of compounds selected from the following general formulae (3) and (4):

General formula (3)

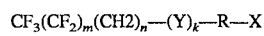

General formula (4)

where m is an integer of 2 to 12, n is an integer of 0 to 12, k is a number of 0 or 1, R represents a saturated or unsaturated alkylene group having 0 to 12 carbon atoms, and the sum of n and the number of carbon atoms in R is 2 or more;

Y is selected from —OCO—, —COO—, —CONH—, or —O—, and X is selected from —OH, —COOH, —SO$_3$M, —OSO$_3$M, —OPO$_3$M$_2$, or —PO$_3$M$_2$; and M is a hydrogen atom, an alkali metal or ammonium.

6. A magnetic recording medium according to one of claims 1 to 3, wherein the fluorine compound is one type or more of compounds selected from the following general formula (5):

 General formula (5)

where R$_1$ represents F or CF$_3$, and n is an integer of 10 to 100;

X is a monovalent group selected from —C$_2$F$_5$, —OH, —COOH, —SO$_3$M, —OPO$_3$M$_2$, or —PO$_3$M$_2$; and M is selected from hydrogen atom, alkali metal or ammonium.

7. A magnetic recording medium according to claim 1 or 2, wherein R in general formula (1) is substituted with an alkyl group, an alkoxyl group or an alkylamide group.

8. A magnetic recording medium according to claim 1 or 2, wherein R in general formula (2) is substituted with an alkyl group, an alkoxyl group or an alkylamide group.

* * * * *